United States Patent
Merritt et al.

(10) Patent No.: US 11,979,047 B2
(45) Date of Patent: May 7, 2024

(54) BUSBAR CONTACTOR MATRIX MODULE

(71) Applicant: Rivian IP Holdings, LLC, Plymouth, MI (US)

(72) Inventors: Shawn Warren Merritt, Lomita, CA (US); Thomas Hahn Kim, Granada Hills, CA (US); Jason Huang, Fremont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 433 days.

(21) Appl. No.: 17/382,485

(22) Filed: Jul. 22, 2021

(65) Prior Publication Data

US 2023/0026130 A1   Jan. 26, 2023

(51) Int. Cl.
*H02J 7/00* (2006.01)
*H02G 5/02* (2006.01)
*H02M 7/04* (2006.01)

(52) U.S. Cl.
CPC ............. *H02J 7/0042* (2013.01); *H02G 5/02* (2013.01); *H02M 7/04* (2013.01)

(58) Field of Classification Search
CPC .. B60L 53/30; B60L 2210/00; B60L 2210/30; B60L 2210/40; H02G 5/00; H02G 5/02; H02G 5/025; H02J 7/0042; H02M 7/04
See application file for complete search history.

(56) References Cited

U.S. PATENT DOCUMENTS

| | | | |
|---|---|---|---|
| 11,285,831 B1 * | 3/2022 | Youssefzadeh | H02B 1/052 |
| 2010/0308768 A1 * | 12/2010 | Dower | H02J 7/0045 |
| | | | 320/109 |
| 2013/0279082 A1 * | 10/2013 | Valenzuela | H01R 25/162 |
| | | | 361/637 |
| 2018/0342883 A1 * | 11/2018 | Inskeep | H02J 7/0045 |

* cited by examiner

*Primary Examiner* — Richard Isla
*Assistant Examiner* — Sadia Kousar
(74) *Attorney, Agent, or Firm* — Foley & Lardner LLP

(57) ABSTRACT

Various disclosed embodiments include a switching module for a charger includes a support member, a first busbar coupled to the support member, the first busbar being configured to conduct electrical current, and a second busbar coupled to the support member, the second busbar being configured to conduct electrical current. The switching module also includes a first switch coupled to the first busbar and configured to move a first contactor. The switching module further includes a second switch coupled to the second busbar and configured to move a second contactor. The switching module also includes a third switch coupled to the first busbar and configured to move a third contactor. Further, the switching module includes a fourth switch coupled to the second busbar and configured to move a fourth contactor, the third and fourth switches being configured to electrically connect and disconnect the first and second busbar with at least a second power dispenser.

20 Claims, 4 Drawing Sheets

BUSBAR CONTACTOR MATRIX MODULE

INTRODUCTION

The present disclosure relates to electric vehicle charging equipment. The statements in this section merely provide background information related to the present disclosure and may not constitute prior art.

Electric vehicle charging cabinets include high voltage conductors, insulators, and switching units which may be pieced together as individual electrical parts secured to some part of the charging cabinet housing. Because the parts for a charging cabinet are arranged somewhat individually and wired together with conductor segments, repair and diagnosis can be difficult.

BRIEF SUMMARY

Various disclosed embodiments include illustrative switching modules for battery chargers and power electronics modules.

In an illustrative embodiment a switching module for a charger includes a support member, a first busbar coupled to the support member, the first busbar being configured to conduct electrical current, and a second busbar coupled to the support member, the second busbar being configured to conduct electrical current. The switching module also includes a first switch coupled to the first busbar and configured to move a first contactor. The switching module further includes a second switch coupled to the second busbar and configured to move a second contactor. The switching module also includes a third switch coupled to the first busbar and configured to move a third contactor. Further, the switching module includes a fourth switch coupled to the second busbar and configured to move a fourth contactor, the third and fourth switches being configured to electrically connect and disconnect the first and second busbar with at least a second power dispenser.

In another illustrative embodiment a battery charger includes a housing and an electrical power input from an electrical power source, the electrical power input being supported by the housing. The battery charger also include a Power Electronics Module (PEM) supported within the housing. Further, the battery charger includes a switching module including: a support member; at least two busbars coupled to the support member; and at least four switches electrically coupled to the busbars. The two busbars may be configured to carry electrical current and the switches may be configured to connect and disconnect electrically with at least one power dispenser.

In another illustrative embodiment a Power Electronics Module includes an AC power input and a rectifier circuit electrically coupled to the AC power input and electrically coupled to a DC power output. A switching module may be coupled to the power electronics module, the switching module having a support member, at least two busbars coupled to the support member, and at least four switches electrically coupled to the busbars, the two busbars being configured to conduct electrical current from the DC power output through the switches that are being configured to connect and disconnect with at least one power dispenser.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
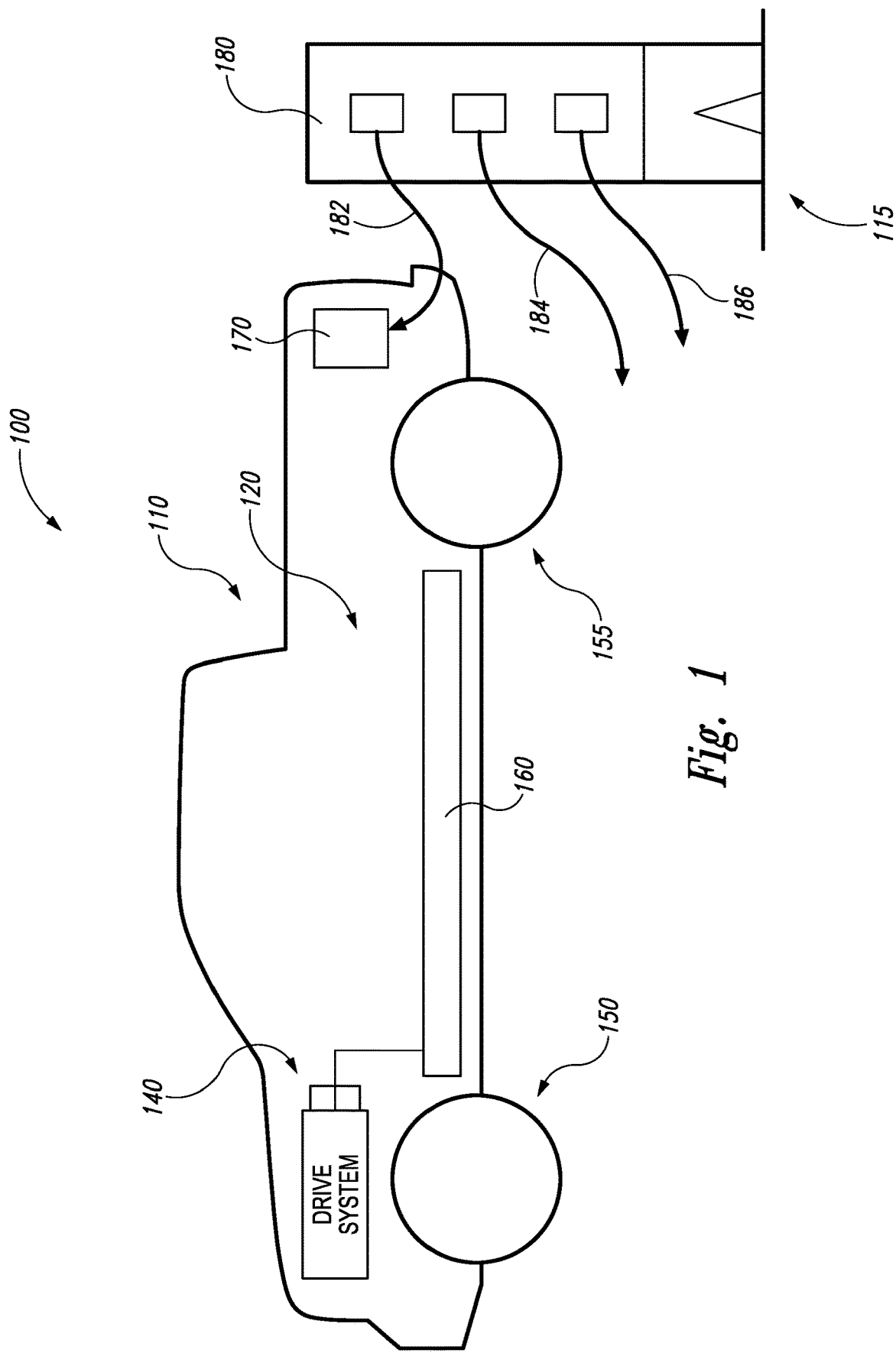
FIG. 1 is a block diagram in partial schematic form of an illustrative vehicle including various on-board systems and a charging station.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of overview, various disclosed embodiments include illustrative switching modules for battery chargers and power electronics modules. As will be described below, in various embodiments a busbar contactor matrix module as described herein can enable a power cabinet to provide power to any combination of dispensers, also known as power sharing.

While contactors (also known as relays) can be connected by wire or busbar to make a matrix, such relays are typically mounted to a wall or panel, and other components may have to be removed to gain access to the contactor. However, in various embodiments, contactors are mounted to a plate, and busbars connect positive contactors and negative contactors. An isolator may align the busbars and alignment pins to form a module. The module is then mounted to the back of the Power Electronics Module (PEM). Hereinafter, a busbar contactor matrix module may generally be referred to as a "switching module"

Referring now to FIG. 1, in various embodiments a system 100 includes an electric vehicle 110, such as without limitation a truck, SUV, van, car, or any other electrified vehicle and a charging station 115. The electric vehicle 110 may include a vehicle chassis 120 and electric motor drive system 140. The electric vehicle 110 is not limited to one or more drive systems that include electric drive motors, but rather any number and arrangement of electric vehicle motors may be used on the electric vehicle 110 without departing from the scope of the disclosure. Wheels 150 and 155 support vehicle chassis 120 which carries a battery pack 160. In various embodiments, the electric vehicle 110 also includes a charging port 170 that accepts at least one of a variety of charging connectors, such as, but not limited to, a J1172 Type 1 connector, a J1772 Type 2 connector, a Tesla connector, a Combined Charging System (CCS) connector, and a CHAdeMo connector, among others.

In various embodiments the charging station 115 includes a charging cabinet 180 having three dispensers 182, 184, and 186 coupled thereto and configured to receive charging power therefrom. Although three dispensers are shown as being connected to the charging cabinet 180, it will be appreciated that, in various embodiments, any number of dispensers may be connected to the charging cabinet 180. It will be appreciated that, in various embodiments, the use of a busbar contactor matrix module allows for switching between the various dispensers or providing service to any combination of the dispensers.

Figure 2:
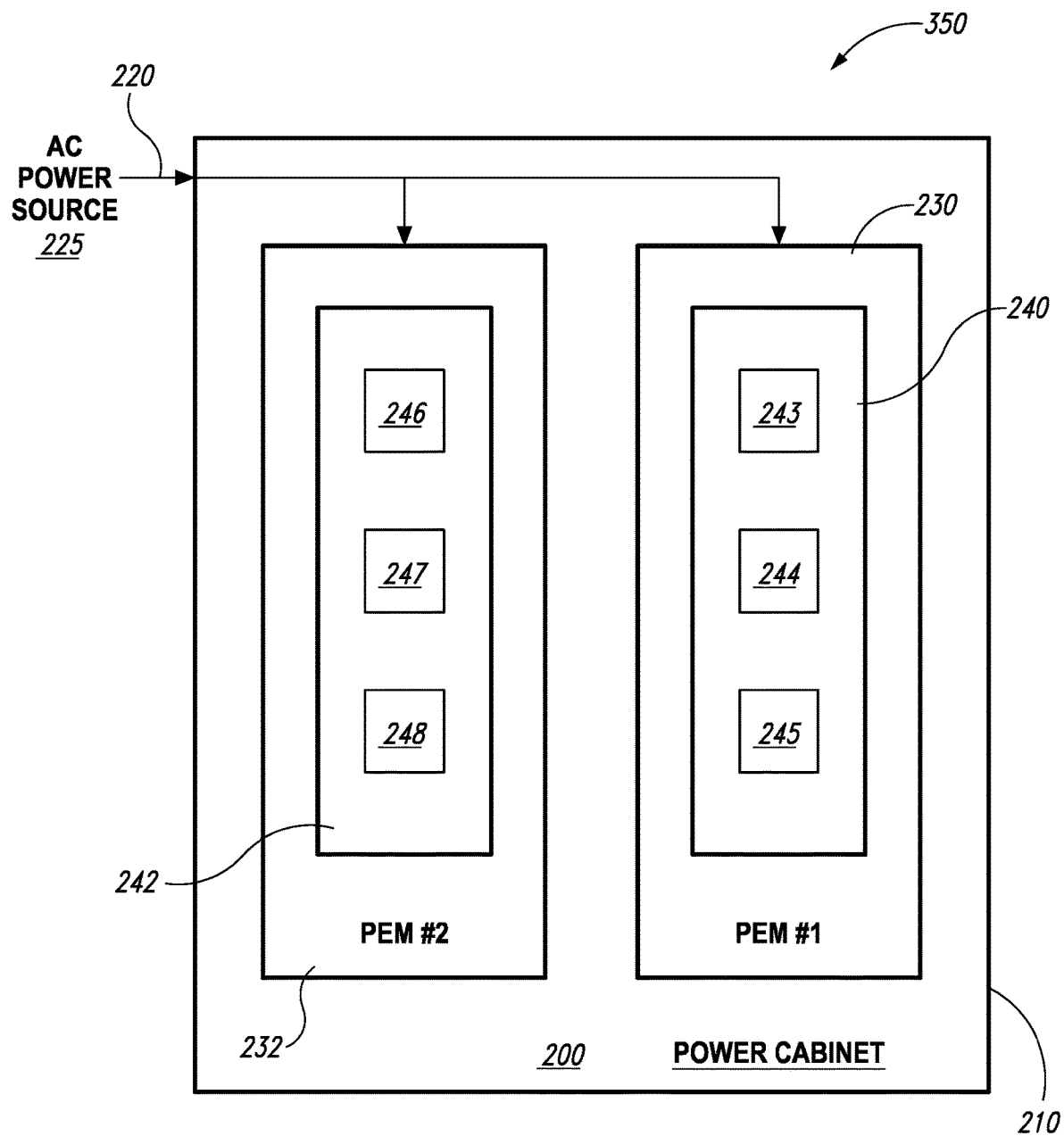
FIG. 2 is a block diagram of an illustrative power cabinet.

Referring now to FIG. 2, in various embodiments a power cabinet 200 is depicted. The power cabinet 200 includes a housing 210 and an electrical power input 220 from an electrical power source, such as an AC power source 225. The electrical power input 220 extends into and is, thus, supported by the housing 210. In various embodiments, a Power Electronics Module (PEM) 230 is supported within the housing 210. A power cabinet, such as the power cabinet 210 may, in various embodiments house more than one PEM. In the example shown, a second PEM 232 is depicted within housing 210. Each of PEM 230 and 232 have the function of power inversion, converting the incoming AC power into DC power. In various embodiments, a switching module 240 is coupled to the PEM 230. Similarly, the PEM 232 is coupled to a switching module 242. In various embodiments each of the switching modules 240 and 242 as shown include three power outputs which are coupled to dispenser connections in the power cabinet 200. For example, the switching module 240 is depicted with power outputs 243, 244, and 245 and PEM 242 similarly is depicted with power outputs 246, 247, and 248. In various embodiments, any number of outputs could be used without departing from the scope of the disclosure.

In operation, in various embodiments the PEM 240 converts incoming AC power from AC power source 225 to DC power. For example, when a vehicle is connected for charging to a dispenser that is coupled to the power output 243, the power output 243 may be activated (i.e., the power output of 243 receives DC power from the PEM through the switching module 240) and charging of the vehicle occurs. If, for example, a vehicle was connected to a dispenser that is coupled to the power output 243 and another vehicle is connected to a vehicle that is coupled to the power output 245, then the switching module 240 can activate the power outputs 243 and 245 at the same time or one after the other.

Figure 3:
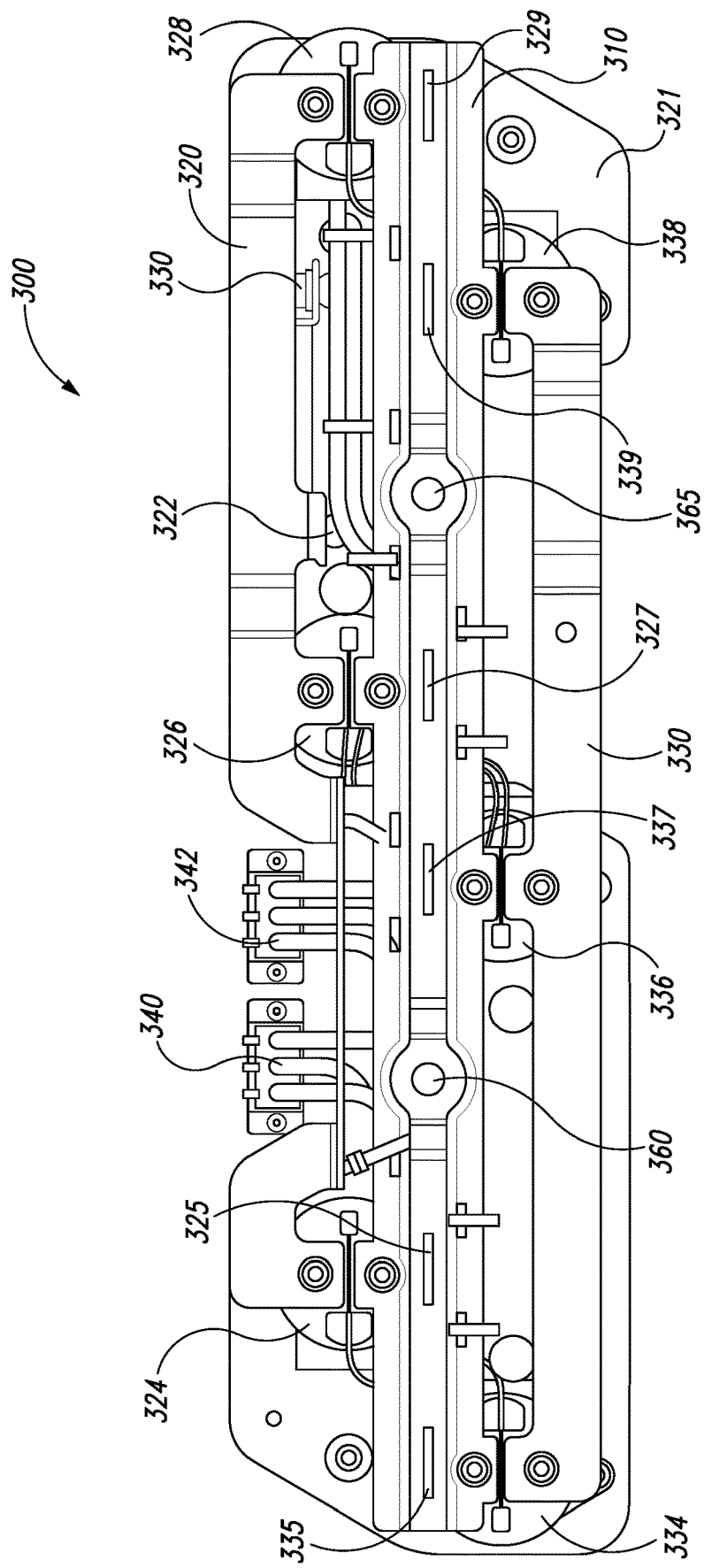
FIG. 3 is a side plan view in partial cutaway of an illustrative busbar contactor matrix module.

Referring additionally to FIG. 3, in various embodiments an illustrative switching module 300 includes a support member 310 which may be formed of an electrically insulative material such as any one or more of many well-known plastics and the like. A first busbar 320 is coupled to a support member 310 via a plate 321. A second busbar 330 is also coupled to the support member 310 via the plate 321. The first busbar 320 may be electrically connected to the PEM output by a first electrical connection 322. Electrical connection 322 may be a positive (+) input or a negative (−) input terminal. The second busbar 330 may be electrically connected to the PEM output by a second electrical connection 332. Electrical connection 332 may be a negative (−) input or a positive (+) input terminal whichever is opposite polarity to electrical connection 322. In some embodiments the electrical connection from the electrical connection 322 to the busbar 330 may be made through a fuse or fusible link.

In various embodiments, there may be three pairs of switches 324/334, 326/336, and 328/338. In operation, if a pair of switches is activated, then one of the outputs, e.g. 243, 244, or 245 (see FIG. 2) to one of the dispensers e.g., 182, 184, or 186 (see FIG. 1) is activated. For example, when the switch 324 is activated (i.e. switched on in response to a control signal), a contactor 325 is caused to extend (as shown in a direction out of the paper toward the reader by an electromechanical actuator or the like). Likewise, when the switch 334 that is paired with switch 324 is activated, a contactor 335 is caused to extend in the same direction as the contactor 325. It will be appreciated that contactors 325/335, when extended, may create an electrical connection to a dispenser output (e.g., one of dispenser outputs 243-248) of the power cabinet 200 as shown in FIGS. 1 and 2. For example, the contactor 325 may be a positive (+) contact and the contactor 335 may be a negative (−) contact. Similarly, switch pair 326/336, when activated, causes extension of the contactors 327(+)/337(−) and switch pair 328/338, when activated, causes extension of the contactors 329(+)/339(−) respectively. Each contactor pair 325/335, 327/337 and 329/339 electrically connects to a different dispenser of the power cabinet 200 via a respective connector. It should be noted that although the contactors 325, 327, and 339 have been designated as positive (+) contactors and 335, 337, and 339 have been designated as negative (−) contactors, the arrangement of (+) and (−) contactors may be reversed without departing from the scope of the disclosure as long as each pair of contactors is a (+) and (−) pair.

In various embodiments, wiring harnesses 340 and 342 include control wires coupled to the switches 324/334, 326/336, and 328/338. Signals provided over wires of wiring harness 340 and 342 control the activation of the switches 324/334, 326/336, and 328/338 and, in turn, the selective output of the dispensers e.g., 182, 184, or 186. The wiring harnesses 340 and 342 are shown with a particular type of connector, but it will be appreciated that any of a variety of connectors can be used.

It will be appreciated that, in various embodiments, the switching module 300 suitably is modular, that is, the switching units are all packaged as a single module, thereby requiring less wiring within the power cabinet. It will be appreciated that, in various embodiments, use of a modular busbar structure in which the switching unit includes a positive (+) and a negative (−) busbar coupled to more than one contactor pair and having multiple switches for switching between contactor pairs is assembled into a replaceable module similar to the module 300 can contribute to reduced wiring as conductive paths to the various dispensers use shared busbars. The modular nature can also allow for easier assembly, maintenance and repair than non-modular implementations. For example, in a repair situation, a switch may fail which may be difficult to diagnose. In various embodiments, instead of going through a long troubleshooting process, the switching module 300 may be swapped out on-site. In such instances, the older module can be diagnosed at a later time and possibly refurbished. Module 300 also includes a first and second locator feature 360 and 365. The locator features may be, but are not limited to, protruding conical-shaped columns which are configured to engage with female receivers on the power cabinet 200. This enables the contactors to be properly aligned with contacts on the power cabinet 200.

Figure 4:
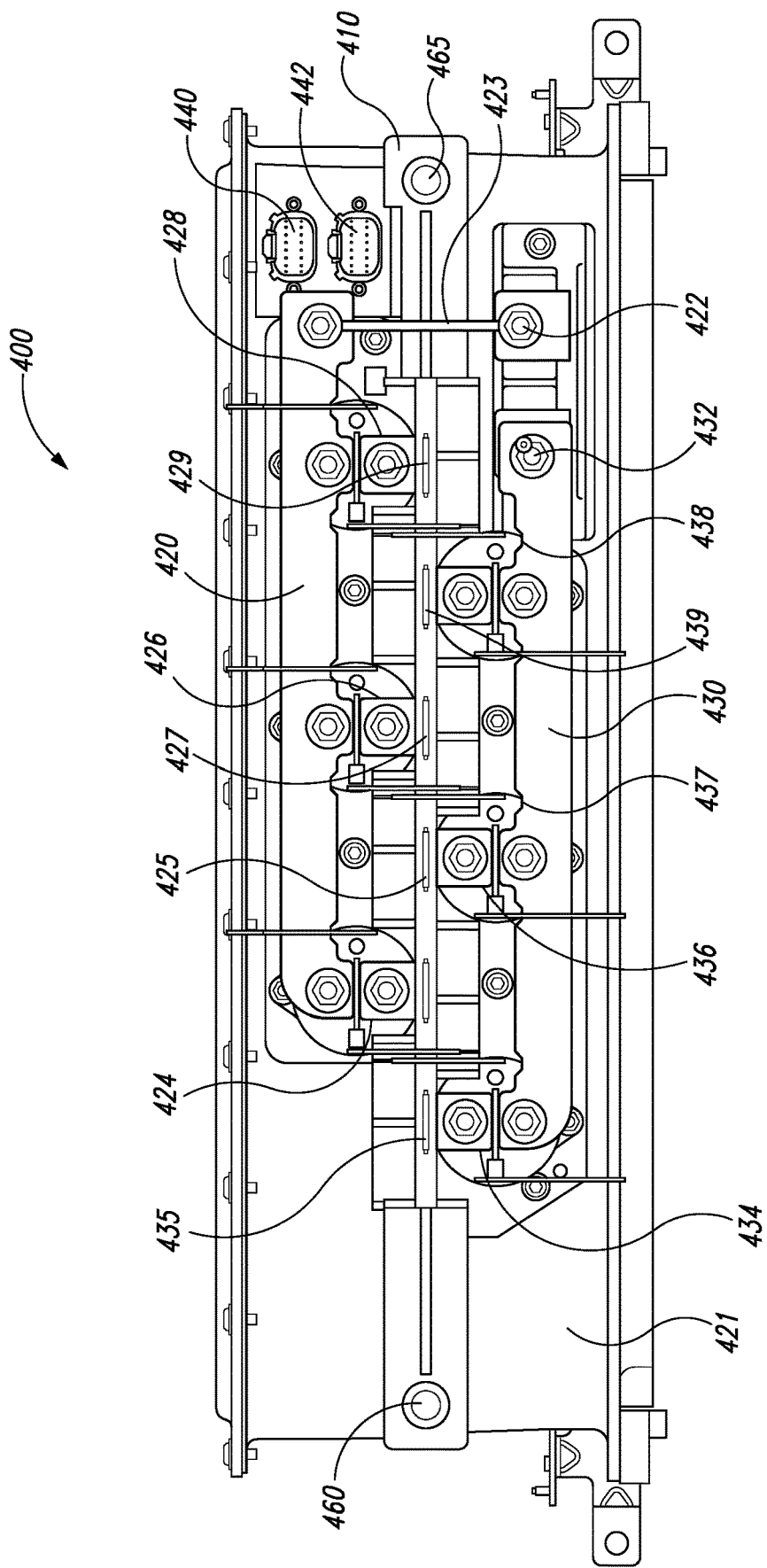
FIG. 4 is a side plan view in partial cutaway of another illustrative busbar contactor matrix module.

Referring additionally to FIG. 4, in various embodiments an illustrative switching module 400 is functionally equivalent to the switching module 300 with a slightly different structure. In such embodiments the switching module 400 includes an electrically insulative support member 410 coupled to two busbars 420 and 430 via a back plate 421. An input 422 is electrically coupled to the busbar 420 by a fuse 423. An input 432 is electrically coupled to the busbar 430.

Pairs of switches 424/434, 426/436, and 428/438 correspond with activation of contactors 425/435, 427/437, and 429/439. A module 440 includes female pin connectors for receiving a wiring harness pin connector from the PEM 230 for carrying switching signals. To aid in assembling of the module 400 onto the power cabinet 200, male locator features 460 and 465 engage with female locators in the power cabinet 200. This engagement of locator features helps enable alignment of the contactors 425/435, 427/437, and 429/439 with their respective contacts in the power cabinet, each contact corresponding with a respective dispenser.

While the illustrative switching modules 300 and 400 have been shown and described, it will be appreciated that other configurations utilizing some of these design features and functions are within the scope of this disclosure. As such, it will be appreciated that the illustrative switching modules 300 and 400 are provided as non-limiting examples given by way of illustration only and should not be seen as limiting.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A switching module for a charger, the switching module comprising:
   a support member;
   a first busbar coupled to the support member, the first busbar being configured to conduct electrical current;
   a second busbar coupled to the support member, the second busbar being configured to conduct electrical current;
   a first switch coupled to the first busbar and configured to move a first contactor;
   a second switch coupled to the second busbar and configured to move a second contactor, the first and second switches being configured to electrically connect and disconnect the first and second busbar with at least a first power dispenser by moving the first and second contactors;
   a third switch coupled to the first busbar and configured to move a third contactor; and
   a fourth switch coupled to the second busbar and configured to move a fourth contactor, the third and fourth switches being configured to electrically connect and disconnect the first and second busbar with at least a second power dispenser by moving the third and fourth contactors.

2. The switching module of claim 1, further comprising:
a first power input electrically coupled to the first busbar; and
a second power input electrically coupled to the second busbar.

3. The switching module of claim 2, further comprising:
a fuse between the second power input and the second busbar.

4. The switching module of claim 2, wherein the first power input is a positive power input and the second power input is a negative power input.

5. The switching module of claim 1, further comprising:
a wiring harness electrically coupled to a connector at a first end and electrically coupled to the first switch, the second switch, the third switch, and the fourth switch at a second end, the wiring harness being configured to deliver control signals to the first, second, third, and fourth switches.

6. The switching module of claim 1, further comprising at least one locator feature coupled to the support member.

7. The switching module of claim 1, wherein the contactors include blade contactors.

8. The switching module of claim 1, wherein the first busbar and the second busbar comprise copper.

9. The switching module of claim 1, wherein the support member comprises an electrically insulative material separating the first busbar from the second busbar.

10. A battery charger comprising:
a housing;
an electrical power input from an electrical power source, the electrical power input being supported by the housing;
a Power Electronics Module (PEM) supported within the housing; and
a switching module including:
a support member;
a plurality of busbars coupled to the support member; and
a plurality of switches electrically coupled to the plurality of busbars, the plurality of busbars being configured to carry electrical current and the plurality of switches being configured to connect and disconnect, electrically, with a plurality of power dispensers via a plurality of contactors, the plurality of switches comprising:
a first switch coupled with a first busbar of the plurality of busbars to move a first contactor of the plurality of contactors;
a second switch coupled with a second busbar of the plurality of busbars to move a second contactor of the plurality of contactors;
a third switch coupled with the first busbar of the plurality of busbars to move a third contactor of the plurality of contactors; and
a fourth switch coupled with the second busbar of the plurality of busbars to move a fourth contactor of the plurality of contactors.

11. The battery charger of claim 10, further comprising:
a first power input electrically coupled to the first busbar; and
a second power input electrically coupled to the second busbar, the first and second power inputs coming from the PEM.

12. The battery charger of claim 11, further comprising:
a fuse between the second power input and the second busbar.

13. The battery charger of claim 11, wherein:
the first power input is a positive power input and the second power input is a negative power input.

14. The battery charger of claim 10, further comprising:
a wiring harness electrically coupled to a connector at a first end and electrically coupled to the switches at a second end, the wiring harness being configured to deliver control signals to the switches from the PEM.

15. The battery charger of claim 10, further comprising:
at least one locator feature coupled to the support member to aid in locating the position and orientation of the switching module relative to the housing.

16. The battery charger of claim 10, wherein the switches comprise blade contactors.

17. The battery charger of claim 10, wherein the busbars comprise copper.

18. The battery charger of claim 10, wherein the support member comprises an electrically insulative material between the plurality of busbars.

19. The battery charger of claim 10, wherein the housing supports at least three power dispensers.

20. A Power Electronics Module (PEM), comprising:
an AC power input;
a rectifier circuit electrically coupled to the AC power input and electrically coupled to a DC power output; and
a switching module coupled to the power electronics module, the switching module having a support member, a first busbar and a second busbar coupled to the support member, and four switches electrically coupled to the busbars, the busbars being configured to conduct electrical current from the DC power output through the four switches, the four switches comprising:
a first switch coupled with the first busbar and configured to actuate a first contactor;
a second switch coupled with the second busbar and configured to actuate a second contactor, the first and second contactors to electrically connect the first and second busbars with a first power dispenser;
a third switch coupled with the first busbar and configured to actuate a third contactor; and
a fourth switch coupled with the second busbar and configured to actuate a fourth contactor, the third and fourth contactors to electrically connect the first and second busbars with a second power dispenser.

* * * * *